(12) United States Patent
Hanmer et al.

(10) Patent No.: US 6,379,758 B1
(45) Date of Patent: *Apr. 30, 2002

(54) LIQUID CRYSTAL DISPLAY DEVICE

(75) Inventors: James Hanmer, Hampshire; Mark Verrall, Blandford Forum, both of (GB)

(73) Assignee: Merck Patent Gesellschaft mit beschrankter Haftung, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,495

(22) PCT Filed: Jun. 18, 1997

(86) PCT No.: PCT/EP97/03168

§ 371 Date: Dec. 30, 1998

§ 102(e) Date: Dec. 30, 1998

(87) PCT Pub. No.: WO98/00475

PCT Pub. Date: Jan. 8, 1998

(30) Foreign Application Priority Data

Jul. 1, 1996 (EP) .............................. 96110579

(51) Int. Cl.[7] ...................... C09K 19/52; C09K 19/38; G02F 1/1335
(52) U.S. Cl. .................... 428/1.1; 428/1.5; 252/299.01; 349/117
(58) Field of Search .................. 252/299.01; 428/1.1, 428/1.5; 349/117

(56) References Cited

U.S. PATENT DOCUMENTS

| | | | | |
|---|---|---|---|---|
| 5,193,020 A | * | 3/1993 | Shiozaki et al. .............. 359/73 |
| 5,308,535 A | | 5/1994 | Scheible | |
| 5,456,867 A | | 10/1995 | Mazaki et al. | |
| 5,460,748 A | | 10/1995 | Mazaki et al. | |
| 5,506,704 A | | 4/1996 | Broor et al. | |
| 5,526,150 A | | 6/1996 | Mazaki et al. | |
| 5,543,267 A | | 8/1996 | Stumpe et al. | |
| 5,578,243 A | * | 11/1996 | Mazaki et al. ......... 252/299.01 |
| 5,589,237 A | | 12/1996 | Akashi et al. | |
| 5,599,478 A | * | 2/1997 | Matumoto et al. ..... 252/299.01 |
| 5,620,781 A | | 4/1997 | Akashi et al. | |
| 5,635,105 A | * | 6/1997 | Kawata et al. ......... 252/299.01 |
| 5,641,846 A | | 6/1997 | Bieringer et al. | |
| 5,679,414 A | * | 10/1997 | Akashi et al. ................. 428/1 |
| 5,736,066 A | * | 4/1998 | Noguchi et al. ....... 252/299.01 |
| 5,750,051 A | * | 5/1998 | Goulding et al. ...... 252/299.65 |
| 5,762,823 A | * | 6/1998 | Hikmet .................. 252/299.01 |
| 5,770,107 A | * | 6/1998 | Hassall et al. ........... 252/299.6 |
| 5,833,880 A | * | 11/1998 | Siemensmeyer et al. ..................... 252/299.64 |
| 5,863,457 A | * | 1/1999 | Hasebe et al. ......... 252/299.01 |
| 5,948,486 A | * | 9/1999 | Sage et al. ................... 428/1.1 |
| 6,010,641 A | * | 1/2000 | Sage et al. ............. 252/299.01 |
| 6,010,643 A | * | 1/2000 | Coates et al. .......... 252/299.63 |
| 6,013,197 A | * | 1/2000 | Parri et al. ............. 252/299.01 |
| 6,031,015 A | * | 2/2000 | Ritter et al. ................... 522/77 |
| 6,096,241 A | * | 8/2000 | Coates et al. .......... 252/299.01 |
| 6,117,920 A | * | 9/2000 | Jolliffe et al. ................ 522/170 |
| 6,120,701 A | * | 9/2000 | Hsu ....................... 252/299.01 |
| 6,124,908 A | * | 9/2000 | Kobayashi et al. ......... 349/106 |

FOREIGN PATENT DOCUMENTS

| | | |
|---|---|---|
| EP | 524028 | 1/1993 |
| EP | 529813 | 3/1993 |
| EP | 606940 | 1/1994 |
| EP | 622789 | 3/1994 |
| EP | 628847 | 12/1994 |
| EP | 643121 | 3/1995 |
| EP | 704513 | 4/1996 |
| EP | 823442 | 2/1998 |
| EP | 860455 | 8/1998 |
| GB | 2299333 | 10/1996 |
| GB | 2306470 | 5/1997 |
| WO | 9016005 | 12/1990 |
| WO | 9422977 | 10/1994 |
| WO | 9612209 | 4/1996 |
| WO | 9625470 | 8/1996 |
| WO | 9744409 | 11/1997 |
| WO | 9744702 | 11/1997 |

OTHER PUBLICATIONS

English Abstract EP 860455.
English Abstract EP 823442.
English Abstract WO 974409.

* cited by examiner

Primary Examiner—Shean C. Wu
(74) Attorney, Agent, or Firm—Millen, White, Zelano & Branigan, P.C.

(57) ABSTRACT

The invention relates to a liquid crystal display device comprising a liquid crystal cell and at least one compensation film or a combination of polarizer and optical compensators comprising at least one compensation film, said compensation film comprising at least one layer of an isotropic polymer obtainable by polymerization of a mixture of a polymerizable mesogenic material comprising:

a) compound having one or two more polymerizable functional group, in the presences b) an initiator, c) optionally a non-polymerizable compound having two or more polymerizable functional groups and d) optionally a stabilizer, characterized in that said layer of an anisotropic polymer has a hometropic or tilted hometropic molecular orientation. The invention also relates to methods of manufacturing said compensation films. The invention further relates to mixtures of chiral polymerizable mesogenic material used for manufacturing of said compensation films.

35 Claims, 3 Drawing Sheets

50   51 52 53   54         55

LIQUID CRYSTAL DISPLAY DEVICE

The invention relates to a liquid crystal display device comprising a liquid crystal cell and at least one compensation film or a combination of polarizers and optical compensators comprising at least one compensation film, said compensation film comprising at least one layer of an anisotropic polymer obtainable by polymerization of a mixture of a polymerizable mesogenic material comprising a) at least one mesogen having at least one polymerizable functional group, in the presence of b) an initiator, c) optionally a non-mesogenic compound having two or more polymerizable functional groups and d) optionally a stabilizer, characterized in that the layer of the anisotropic polymer has a homeotropic or tilted homeotropic molecular orientation.

The invention also relates to methods of manufacturing said compensation films. The invention further relates to mixtures of polymerizable mesogenic material used for the manufacturing of said compensation films. The invention also relates to the use of said compensation films for compensating the viewing angle dependence of the phase retardation of light transmitted by a broad band reflective polarizer.

Figure 1A:
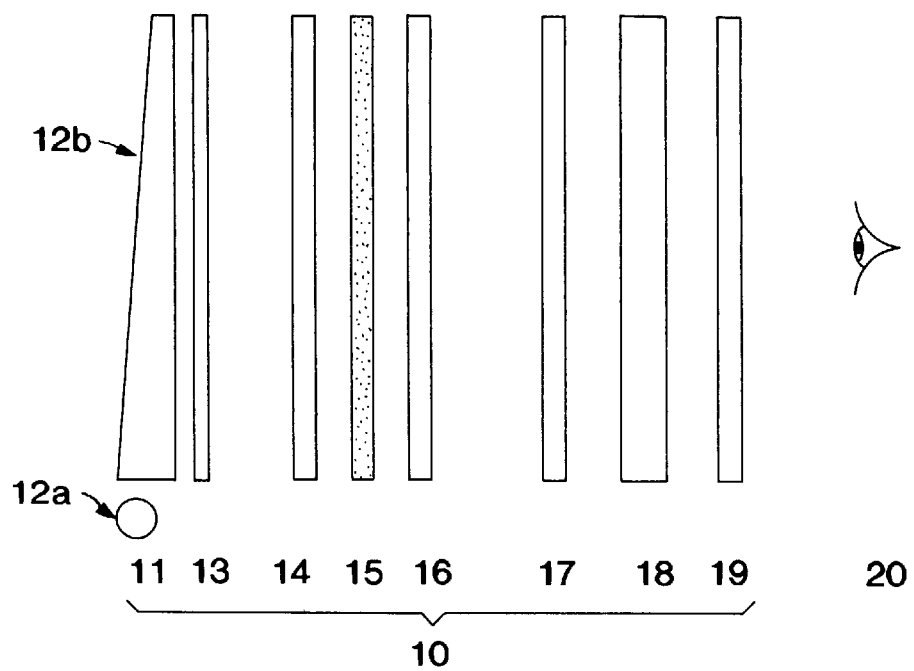
FIGS. 1a and 1b show a display device according to preferred embodiments of the present invention.

EP 0 606 940 discloses a cholesteric reflective polarizer that produces circularly polarized light or, when used together with a quarter wave retardarion film, linearly polarized light of a high luminance over a broad range of wavelengths. However, the optical properties of this polarizer, e.g. the luminance and the contrast ratio, are significantly deteriorating with increasing viewing angles.

It has therefore been desired to have available a compensation film that, when used together with a broad waveband cholesteric reflective polarizer like the one described above, would improve the optical properties of the polarizer over a wide range of viewing angles.

Compensation films have been described in prior art. Usually uniaxially stretched films of an isotropic or LC polymer are used for this purpose. Compensation films made of polymerized mixtures of reactive mesogens have also been mentioned.

JP 05-142531. for example discloses a compensator that comprises a nematic liquid crystal polymer which is aligned in the normal direction of the film. The compensator is made by aligning a liquid crystal that is homeotropically oriented in a glass cell. However, the alignment of a liquid crystal as disclosed in JP 05-142531 is often difficult to achieve and requires high temperatures. Furthermore, the method of polymerizing in a glass cell with subsequent removal of the glass plates as described in the JP 05-142531 is complicated and not suitable for industrial large scale production.

Heynderickx, Broer et al. in Mol. Cryst. Liq. Cryst. 203 (1991), 113–126 describe a compensation film for STN displays made of a polymerized mixture of an achiral mesogenic diacrylate and a chiral dopant. The liquid crystal molecules in this film have a planar orientation. i.e. an orientation, parallel to the film plane. However, polymerizable liquid crystalline compositions containing only one polymerizable compound as disclosed in this document in general exhibit high melting points, which in turn requires high temperatures for alignment and polymerization, which is a serious drawback when manufacturing such films.

Furthermore the compensators described by JP 05-142531 and Heynderickx, Broer et al. are used for compensating liquid crystal displays, for example STN displays, but they are not designed for the compensation of a broad waveband reflective cholesteric polarizer in combination with a liquid crystal display.

Consequently there has been a considerable demand for a compensation film that, when used together with a broad waveband cholesteric reflective polarizer, enhances the optical properties of the polarizer over a wide range of viewing angles, that is easy to fabricate and does not have the disadvantages of the compensation films of prior art as discussed above.

One of the aims of the present invention is to provide a compensation film having these properties. Another aim of the invention is to provide a liquid crystal display device comprising such a compensation film. Other aims of the present invention are immediately evident to the person skilled in the art from the following detailed description.

It has been found that these aims can be achieved by providing a compensation film with a homeotropic or tilted homeotropic molecular orientation according to the present invention.

The object of the invention is a liquid crystal display device comprising a liquid crystal cell and at least one compensation film or a combination of polarizers and optical compensators comprising at least one compensation film, said compensation film comprising at least one layer of an anisotropic polymer obtainable by polymerization of a mixture of a polymerizable mesogenic material comprising a) at least one mesogen having at least one polymerizable functional group, in the presence of b) an initiator, c) optionally a non-mesogenic compound having two or more polymerizable functional groups and d) optionally a stabilizer, characterized in that said layer of an anisotropic polymer has a homeotropic or tilted homeotropic orientation.

In a preferred embodiment of the invention the liquid crystal display device is characterized in that it comprises a broad band reflective polarizer. The bandwidth of the wavelength band reflected from this broad band reflective polarizer is at least 100, preferably at least 150 nm.

In another preferred embodiment of the invention the liquid crystal display device is characterized in that the phase retardation of the compensation film is opposite in sign and substantially equal in magnitude to the phase retardation of the broad band reflective polarizer over a wide range of viewing angles.

In another preferred embodiment of the invention the liquid crystal display device is characterized in that the compensation film is a composite film comprising two or more layers of an anisotropic polymer at least one of said layers having a homeotropic or tilted homeotropic orientation.

In another preferred embodiment of the invention the liquid crystal display device is characterized in that at least one layer of said composite compensation film has an optical symmetry axis with a different orientation than the optical symmetry axis of at least one other of said layers.

In yet another preferred embodiment of the invention the liquid crystal display device is characterized in that the compensation film comprises at least one layer of an anisotropic polymer with an optical symmetry axis having a tilt angle relative to the plane of the layer being in the range from less than 90 degrees but higher than 45, preferably higher than 60, in particular higher than 75 degrees.

The term homeotropic orientation in connection with the layers of anisotropic polymer according to the present invention is indicating in the foregoing and the following that the optical symmetry axis of said layer is either oriented perpendicular to or substantially oriented perpendicular to the layer.

In analogy to this the term tilted homeotropic orientation is indicating that the optical symmetry axis of said layer is having a tilt angle relative to the plane of the layer being in the range from less than 90 degrees but higher than 45, preferably higher than 60, in particular higher than 75 degrees. In a preferred embodiment of the present invention said tilt angle is in the range from 88 to 75, preferably 86 to 80 degrees.

The term viewing angle as referred to in connection with an optical film or a combination of optical films, such as compensation or polarizer films, according to the present invention in the foregoing and the following is to be understood as the angle of observation relative to the normal of the plane of the film under which for example the contrast, the brightness and/or the color shift of the film is characterized by an acceptable level for the envisaged application. The term wide range of viewing angles is to be understood as comprising viewing angles measured from the normal of the plane of the film that are ranging ideally from 0 to ±90 degrees and preferably at least from 0 to ±85 degrees. For most applications, a range from 0 to ±75 degrees is acceptable. In specific display embodiments, angles ranging from 0 to ±60, or even 0 to ±50 degrees are still suitable.

Another object of the invention is a compensation film comprising at least one layer of an anisotropic polymer with homeotropic or tilted homeotropic molecular orientation, characterized in that said compensation film is obtainable by
A) coating a mixture of a polymerizable mesogenic material comprising
   a) at least one mesogen having at least one polymerizable functional group in the presence of
   b) an initiator,
   c) optionally a non-mesogenic compound having two or more polymerizable functional groups, and
   d) optionally a stabilizer
      on at least one substrate in form of a layer,
B) aligning said mixture in a homeotropic or tilted homeotropic orientation,
C) polymerizing said mixture by exposing it to heat or actinic radiation,
D) optionally repeating the steps A), B) and C) at least one more time, and
E) optionally removing one or both of the substrates from the polymerized material, In a preferred embodiment of the invention the compensation film is characterized in that the mixture of the polymerizable mesogenic material contains two or more mesogens having one polymerizable functional group.

In another preferred embodiment of the invention the compensation film is characterized in that the polymerized material forms a three-dimensional network.

In another preferred embodiment of the invention the compensation film is characterized in that the mixture of the polymerizable mesogenic material contains at least one mesogen having one polymerizable functional group and at least one mesogen having two or more polymerizable functional groups.

Another object of the invention is a mixture of a polymerizable mesogenic material as described above.

The terms reactive mesogen, reactive mesogenic compound, reactive liquid crystal (compound) or reactive liquid crystalline compound as used in the foregoing and the following comprise compounds with a rodlike, boardlike or disklike mesogenic group. These mesogenic compounds do not necessarily have to exhibit mesophase behavior by themselves. In a preferred embodiment of the present invention they show mesophase behavior in mixtures with other compounds or after polymerization of the pure mesogenic compounds or mixtures comprising the mesogenic compounds.

In a preferred embodiment the polymerizable mixture comprises reactive mesogenic compounds having one polymerizable group. These compounds are in general easier and cheaper to synthesize. Furthermore, mixtures comprising only monoreactive compounds often show higher stability against unintended spontaneous polymerization than mixtures comprising direactive compounds.

In another preferred embodiment the polymerizable mixture comprises reactive mesogenic compounds having two or more polymerizable functional groups (multifunctional compounds). Upon polymerization of such a mixture a three-dimensional polymer network is formed. A compensation film made of such a network is self-supporting and shows a high mechanical and thermal stability and a low temperature dependence of its physical properties.

In another preferred embodiment the polymerizable mixture comprises up to 20% of a non mesogenic compound with two or more polymerizable functional groups to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

By varying the concentration of the multifunctional mesogenic or non mesogenic compounds the crosslink density of the polymer film and thereby its physical and chemical properties such as the glass transition temperature, which is also important for the temperature dependence of the optical properties of the compensator, the thermal and mechanical stability or the solvent resistance can be tuned easily.

The inventive polymerizable mixture is coated onto at least one substrate in the form of a layer, aligned and polymerized. As a substrate for example a glass or quarz sheet as well as a plastic film or sheet can be used. It is also possible to put a second substrate on top of the coated mixture prior to, during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

Preferably at least one substrate is a plastic substrate such as for example a polyethyleneterephthalate (PET), polyvinylalcohol (PVA), polycarbonate (PC) or triacetylcellulose (TAC) film, preferably a PET film. As a birefringent substrate for example an uniaxially stretched plastic film can be used.

To achieve homeotropic or tilted homeotropic,alignment the mesogenic material is preferably coated onto substrates carrying an alignment layer. Suitable aligning agents used on glass substrates are for example alkyltrichlorosilane or lecithine, whereas for a plastic substrate thin layers of lecithine, silica or high tilt polyimide orientation films as aligning agents may be used. In a preferred embodiment of the invention a silica coated plastic film is used as a substrate.

Polymerization of the inventive polymerizable mesogenic mixture takes place by exposing it to heat or to actinic radiation. Actinic radiation means irradiation with light, X-rays, gamma rays or irradiation with high energy particles, such as ions or electrons. In particular preferably UV light is used. The irradiation wavelength is preferably from 250 nm to 400 nm, especially preferably from 340 nm to 380 nm.

As a source for actinic radiation for example a single UV lamp or a set of UV lamps can be used. When using a high lamp power the curing time can be reduced. The irradiance produced by the lamp used in the invention is preferably from 0.01 to 100 $mW/cm^2$, especially preferably from 10 to 50 $mW/cm^2$.

The curing time is dependent inter alia on the reactivity of the polymerizable mesogenic material, the thickness of the coated layer, the type of polymerization initiator and the power of the UV lamp. For mass production short curing times are preferred.

The polymerization is carried out in the presence of an initiator absorbing the wavelength of the actinic radiation. For example, when polymerizing by means of UV light, a photoinitiator can be used that decomposes under UV irradiation to produce free radicals that start the polymerization reaction. It is also possible to use a cationic photoinitiator, when curing reactive mesogens with for example vinyl and epoxide reactive groups, that photocures with cations instead of free radicals. The polymerization may also be started by an initiator that decomposes when heated above a certain temperature.

In addition to light- or temperature-sensitive initiators the polymerizable mixture may also comprise one or more other suitable components such as, for example, catalysts, stabilizers, co-reacting monomers or surface-active compounds.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain polymer films with good alignment the polymerization has to be carried out in the liquid crystal phase of the mixture of the polymerizable mesogenic material in a homeotropic or tilted homeotropic aligned state. Therefore, preferably a polymerizable mixture having a low melting point is used, preferably a melting point of 100° C. or lower, in particular 60° C. or lower, so that curing can be carried out in the liquid crystalline phase of the mixture at low temperatures. The polymerization process is then made easier, which is of importance especially for mass production. Curing temperatures below 100° C. are preferred. Especially preferred are curing temperatures below 60° C.

Mixtures of polymerizable mesogenic material exhibiting nematic or smectic phases may be used. In a preferred embodiment of the invention the polymerization is carried out in the smectic phase, especially preferably in the smectic A phase of the polymerizable mesogenic mixture. In the smectic phase the alignment is less easily disturbed prior to curing.

In a particularly preferred embodiment of the invention the compensation film is used together with a reflective polarizer and a quarter wave optical retarder. The compensation film may be connected to the reflective polarizer as a separate optical element. Preferably, the reflective polarizer and the compensation film are integrated so that they form an individual optical element. This can be done for example by laminating the compensation film and the reflective polarizer together after manufacturing the compensation film.

In another preferred embodiment the polymerizable mesogenic material is coated and cured directly onto a reflective polarizer which serves as a substrate, thus simplifying the production process.

In yet another preferred embodiment the polymerizable mesogenic material is coated and cured on a quarter wave optical retarder which serves as a substrate.

The function of the inventive reflective polarizer is further explained by FIG. 1a, which shows a display device according to a preferred embodiment of the present invention as an example that should not limit the scope of the invention. The main direction of light following the optical path is from the left side to the right side. The display device 10 consists of a side-lit backlight unit 11 with a lamp 12a and a combined light guide and reflector 12b, a diffusor 13 and a polarizer combination consisting of a reflective polarizer 14 comprising a layer of a liquid crystalline material with a helically twisted molecular orientation, an inventive compensation film 15, a quarter wave retardation sheet 16 and a linear polarizer 17. The figure further depicts a liquid crystal cell 18 and a second linear polarizer 19 behind the display cell.

Light emitted from the backlight 11 is interacting with the molecular helix structure of the reflective polarizer 14 with the result that 50% of the intensity of the light incident on the reflective polarizer is transmitted as circular polarized light that is either right-handed or left-handed circular polarized depending on the twist sense of the molecular helix structure of the reflective polarizer, whereas the other 50% of the incident light are reflected as circular polarized light of the opposite handedness. The reflected light is depolarized by the backlight and redirected by the reflector 12b onto the reflective polarizer 14. In this manner, theoretically 100% of the light of a broad range of wavelengths emitted from the backlight 11 are converted into circularly polarized light. The main part of the transmitted component is compensated by the compensation film 15 and converted by the quarter wave retardation sheet 16 into linear polarized light, which is then being transmitted by the linear polarizer 17, whereas light which is not completely transferred into linear polarized by the quarter wave retardation sheet 16, such as elliptically polarized light, is not transmitted by the linear polarizer 17. The linear polarized light then passes through the display 18 and the second linear polarizer 19 to reach the viewer 20.

Figure 1B:
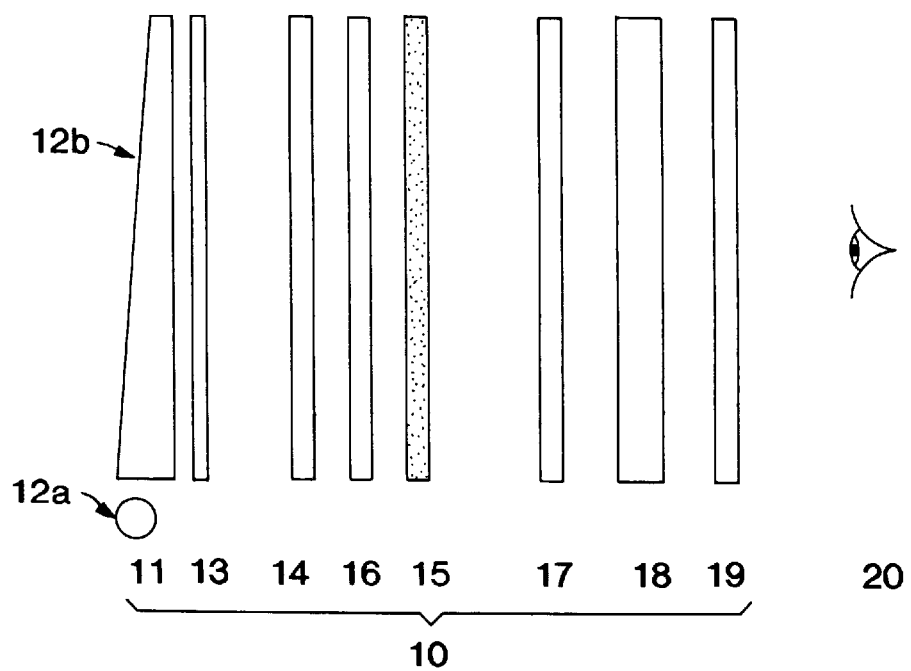

FIG. 1b depicts a display device according to another preferred embodiment of the invention having essentially the same construction as that shown in FIG. 1a, with the modification that here the compensation film 15 is placed behind the quarter wave retarder 16 when looking from the direction of incident light.

For a liquid crystal display comprising a combination with three components, a broad band reflective polarizer 14, a quarter wave retarder 16 and a linear polarizer 17, but without the inventive compensation film 15, the luminance at normal incidence (viewing angle 0°) and at low values of the viewing angle is increased compared to a conventional liquid crystal display comprising a linear polarizer 17 as single component, i.e. without the reflective polarizer 14 and quarter wave retarder 16.

However, as the display comprising the three components 14, 16 and 17 mentioned above is viewed under an increasing angle, the increasing phase retardation by the reflective polarizer 14 itself causes a notable reduction to the luminance, coinciding with the value measured for the conventional display comprising the linear polarizer 17 as a single component at a certain angle. This lowest angle, at which the luminance of a display comprising the three components reflective polarizer 14, quarter wave retarder 16 and linear polarizer 17 ceases to excess that measured for a display comprising 17 as single component, is referred to as the 'cross-over angle'.

When using an inventive compensation film 15 as a fourth component in addition to the three components reflective polarizer 14, quarter wave retarder 16 and linear polarizer 17 as mentioned above in the liquid crystal display, the cross-over angle increases significantly. In other words, the brightness enhancement, i.e. the increase of luminance at low viewing angles, that was achieved by using the reflective polarizer 14 and the quarter wave retarder 16, is now extended also to large viewing angles.

The cross over angle of a display comprising a polarizer combination comprising a compensation film according to the present invention is preferably 30° or larger, particularly preferably 40° or larger, very particularly preferably 50° or larger.

The luminance of a display comprising a reflective broad band polarizer, a quarter wave foil and a compensation film according to the present invention is preferably larger than that of a display that does not comprise the compensation film for viewing angles from 0° to 90°, i.e. for all possible viewing angles.

The colour difference ($\Delta E^*_{uv}$ in the CIE 1976 L*u*v* color space) of a display comprising a reflective broad band polarizer, a quarter wave foil and a compensation film according to the present invention is preferably lower than that of a display that does not comprise the compensation film for viewing angles from 0° to 90°, i.e. for all possible viewing angles.

In a preferred embodiment of the invention the reactive mesogenic compounds used in the mixture of the polymerizable mesogenic material are compounds of formula I $$P-(Sp-X)_n-MG-R \qquad I$$

wherein

| | |
|---|---|
| P | is a polymerizable group, |
| Sp | is a spacer group having 1 to 20 C atoms, |
| X | is a group selected from —O—, —S—, —CO—, —COO—, —OCO—, —OCO—O— or a single bond, |
| n | is 0 or 1, |
| MG | is a mesogenic or mesogenity supporting group, preferably selected according to formula II |

$$-(A^1-Z^1)_m-A^2-Z^2-A^3- \qquad II$$

wherein $A^1$, $A^2$ and $A^3$ are independently from each other 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, $Z^1$ and $Z^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond and m is 0, 1 or 2, and R is an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P—(Sp—X)$_n$—.

Particularly preferred are polymerizable mixtures comprising at least two reactive mesogenic compounds at least one of which is a compound of formula I.

In another preferred embodiment of the invention the reactive mesogenic compounds are selected according to formula 1, wherein R has one of the meanings of P—(Sp—X)$_n$— given above.

Bicyclic and tricyclic mesogenic compounds are preferred.

Halogen is preferably F or Cl.

Of the compounds of formula I especially preferred are those in which R is F, Cl, cyano, alkyl or alkoxy or has the meaning given for P—(Sp—X)$_n$—, and MG is of formula II wherein $Z^1$ and $Z^2$ are —COO—, —OCO—, —CH$_2$—CH$_2$—, —CH=CH—COO—, —OCO—CH=CH— or a single bond.

A smaller group of preferred mesogenic groups of formula II is listed below. For reasons of simplicity, Phe in these groups is 1,4-phenylene, Phe L is a 1,4-phenylene group which is substituted by at least one group L, with L being F, Cl, CN or an optionally fluorinated alkyl, alkoxy or alkanoyl group with 1 to 4 C atoms, and Cyc is 1,4-cyclohexylene.

—Phe—$Z^2$—Phe—      II-1

—Phe—$Z^2$—Cyc—      II-2

| | |
|---|---|
| —PheL—Z²—Phe— | II-3 |
| —PheL—Z²—Cyc— | II-4 |
| —Phe—Z²—PheL— | II-5 |
| —Phe—Z¹—Phe—Phe— | II-6 |
| —Phe—Z¹—Phe—Cyc— | II-7 |
| —Phe—Z¹—Phe—Z²—Phe— | II-8 |
| —Phe—Z¹—Phe—Z²—Cyc— | II-9 |
| —Phe—Z¹—Cyc—Z²—Phe— | II-10 |
| —Phe—Z¹—Cyc—Z²—Cyc— | II-11 |
| —Phe—Z¹—PheL—Z²—Phe— | II-12 |
| —Phe—Z¹—Phe—Z²—PheL— | II-13 |
| —PheL—Z¹—Phe—Z²—PheL— | II-14 |
| —PheL—Z¹—PheL—Z²—Phe— | II-15 |
| —PheL—Z¹—PheL—Z²—PheL— | II-16 |

In these preferred groups $Z_1$ and $Z^2$ have the meaning given in formula I described above. Preferably $Z_1$ and $Z^2$ are —COO—, —OCO—, —CH$_2$CH$_2$— or CH=CH—COO—. L is preferably F, Cl, CN or methyl, methoxy, ethyl, ethoxy, oxamethyl, oxaethyl or trifluormethyl. L is preferably F, Cl, CN, NO$_2$, CH$_3$, C$_2$H$_5$, OCH$_3$, OC$_2$H$_5$, COCH$_3$, COC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, CH$_3$, OCH$_3$ and COCH$_3$.

Particularly preferred are compounds wherein MG is selected from the following formulae wherein L has the meaning given above and r is 0, 1 or 2.

The group in this preferred formulae is very preferably denoting

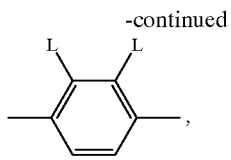

furthermore

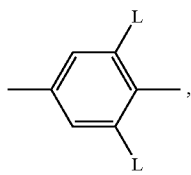

with L having each independently one of the meanings given above.

R in these preferred compounds is particularly preferably CN, F, Cl, OCF$_3$ or an alkyl or alkoxy group with 1 to 12 C atoms or has one of the meanings given for P—(Sp)$_n$—.

If R is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In addition, mesogenic compounds of the formula I containing an achiral branched group R may occasionally be of importance as comonomers, for example, as they reduce the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

P is preferably selected form CH$_2$=CW—COO—, WCH=CH—O—,

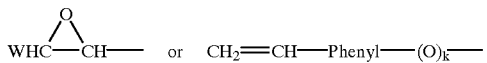

with W being H, CH$_3$ or Cl and k being 0 or 1,

P is particularly preferably a vinyl group, an acrylate group, a methacrylate group, a propenyl ether group or an epoxy group, very particularly preferably an acrylate group.

As for the spacer group Sp all groups can be used that are known for this purpose to the skilled in the art. The spacer group Sp is preferably linked to the polymerizable group P by an ester or ether group or a single bond. The spacer group Sp is preferably a linear or branched alkylene group having 1 to 20 C atoms, in particular 1 to 12 C atoms, in which, in addition, one or more non-adjacent CH$_2$ groups may be replaced by —O—, —S—, —NH—, —N(CH$_3$)—, —CO—, —O—CO—, —S—CO—, —O—COO—, —CO—S—, —CO—O—, —CH(halogen)—, —CH (CN)—, —CH=CH— or —C≡C—.

Typical spacer groups are for example —(CH$_2$)$_o$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$—, with o being an integer from 2 to 12 and r being. an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene and 1-methylalkylene, for example.

In the event that R or Q$^2$ is a group of formula P—Sp—X— or P—Sp— respectively, the spacer groups on each side of the mesogenic core may be identical or different.

In particular preferred are compounds of formula I wherein n is 1.

In another preferred embodiment, the inventive compensator is obtained by copolymerizing mixtures comprising compounds of formula I wherein n is 0 and compounds of formula I wherein n is 1.

Typical examples representing polymerizable mesogenic compounds of the formula I can be found in WO 93/22397; EP 0,261,712; DE 195,04,224; DE 4,408,171 or DE 4,405, 316. The compounds disclosed in these documents, however are to be regarded merely as examples that should not limit the scope of this invention.

Furthermore, typical examples representing polymerizable mesogenic compounds are shown in the following list of compounds, which is, however, to be understood onlyas illustrative without limiting the scope of the present invention:

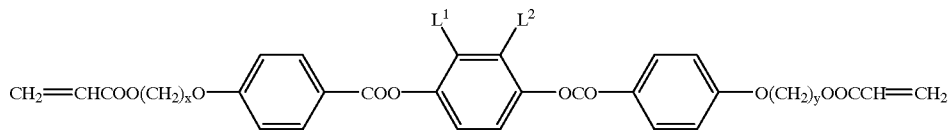

Ia

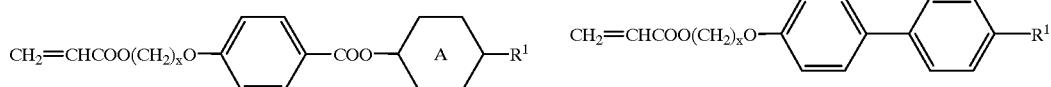

Ib

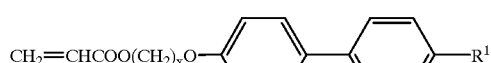

Ic

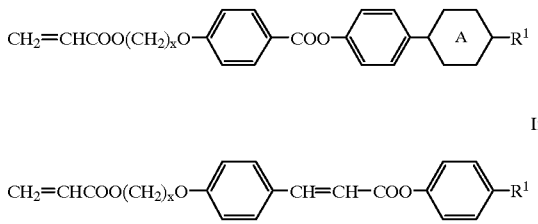
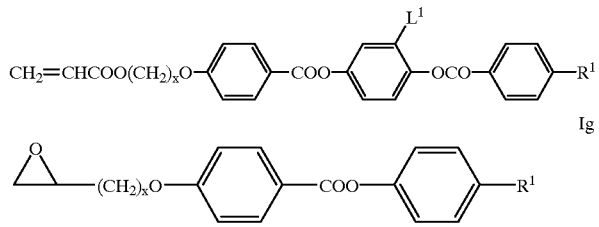

In these compounds x and y are each independently 1 to 12, A is a 1,4-phenylene or 1,4-cyclohexylene group, $R^1$ is halogen, cyano or an optionally halogenated alkyl or alkoxy group with 1 to 12 C atoms and $L^1$ and $L^2$ are each independently H, Halogen, CN, or an alkyl, alkoxy or alkanoyl group with 1 to 7 C atoms.

The reactive mesogenic compounds disclosed in the foregoing and the following can be prepared by methods which are known per se and which are described in the documents cited above and, for example, in standard works of organic chemistry such as, for example, Houben-Weyl, Methoden der organischen Chemie, Thieme-Verlag, Stuttgart.

In a preferred embodiment of the present invention, the compensation film is obtainable from a mixture of a polymerizable mesogenic material comprising the following components a1) 10 to 99% by weight of at least one mesogen according to formula I and II having one polymerizable functional group, a2) 0 to 90% by weight of at least one mesogen according to formula I and II having two or more polymerizable functional groups, b) 0.01 to 5% by weight of an initiator, c) 0 to 20% by weight of a non-mesogenic compound having two or more polymerizable functional groups, and d) 0 to 1000 ppm of a stabilizer.

In a particularly preferred embodiment of the invention the mixture of the polymerizable mesogenic material comprises 15 to 99% preferably 40 to 99%, most preferably 75 to 99% by weight of at least two different mesogens of component a1) and further comprises components b) and optionally components a2), c) and d) as described above.

The mixture according to this particularly preferred embodiment preferably comprises two or three different mesogens according to formula I and II having one polymerizable functional group.

Most preferably the mixture according to this particularly preferred embodiment comprises four or more, in particular four to eight, very particularly four to six different mesogens according to formula I and II having one polymerizable functional group.

The ratio of each of the mesogens according to formula I and II having one polymerizable functional group in the mixture according to this particularly preferred embodiment is preferably 5 to 90, in particular 10 to 80, very preferably 15 to 65% by weight of the total mixture.

In the mixture according to the particularly preferred embodiment described above, preferably each of the different mesogens according to formula I and II is different in at least one of the groups P, Sp, X, $A^1$, $A^2$, $A^3$, $Z^1$, $Z^2$ and R from each other of the mesogens.

The mixture according to this particularly preferred embodiment especially preferably contains less than 10% by weight, very especially preferably none of the compounds of component a2).

In another particularly preferred embodiment of the present invention, the mixture of the polymerizable mesogenic material comprises a1) 15 to 85% by weight of at least one mesogen according to formula I and II having one polymerizable functional group, a2) 10 to 80% by weight of at least one mesogen according to formula I and II having two or more polymerizable functional groups, and further comprises component b) and optionally components c) and d) as described above.

The polymerizable compounds of formula I in the mixtures according to the preferred embodiments described above preferably contain a mesogenic group selected of the preferred formulae II-1 to II-16. Particularly preferably the polymerizable compounds in these preferred mixtures are selected of the exemplary formula Ia to Ig given above.

The mixtures of a polymerizable mesogenic material as described above are another object of the present invention.

Without further elaboration one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight. The following abbreviations are used to illustrate the liquid crystalline phase behaviour of the compounds: K=crystalline; N=nematic; S=smectic; Ch=cholesteric; I=isotropic. The numbers between these symbols indicate the phase transition temperatures in degree Celsius.

EXAMPLE 1A

The following mixture was formulated

| | |
|---|---|
| compound (1) | 24.5% |
| compound (2) | 24.5% |
| compound (3) | 24.5% |
| compound (4) | 24.5% |
| Irgacure 651 | 2.0% |

Irgacure is a commercially available photoinitiator (Ciba Geigy AG). The preparation of compound (1) is described in DE 195,04,224. The compounds (2) to (4) can be prepared analoguously.

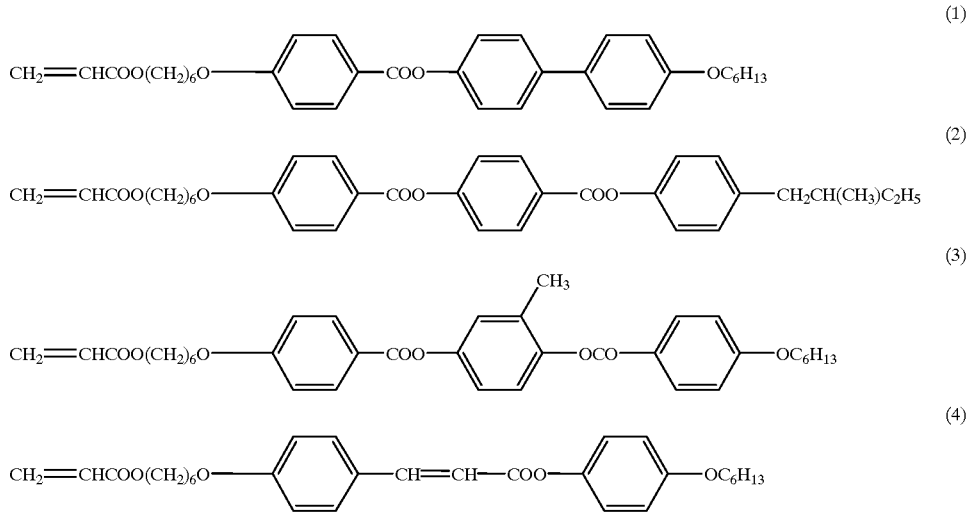

The mixture exhibits the mesophase behaviour $S_A$ 76 Ch 121 I.

To prepare a compensation film, the mixture was dissolved in cyclopentanone and filtered through a 0.2 micron PTFE filter. A sample was coated onto glass by means of a wire wound coating bar (nominally 12 microns coating) and the solvent was allowed to evaporate at 50° C. under a nitrogen atmosphere. The mixture was then cured under a nitrogen atmosphere by exposure to UV light with an irradiance of 70 mW/cm² for 5 minutes to give an anisotropic polymer film with a thickness of 3 microns.

The polymer film was optically clear and showed homeotropic orientation of the mesogenic groups with no birefringence when viewed at normal incidence and increasing birefringence with increasing viewing angle under a polarising optical microscope.

The glass plate with the homeotropic film was attached to a sheet of a broad waveband cholesteric film by means of an adhesive layer.

Figure 2:
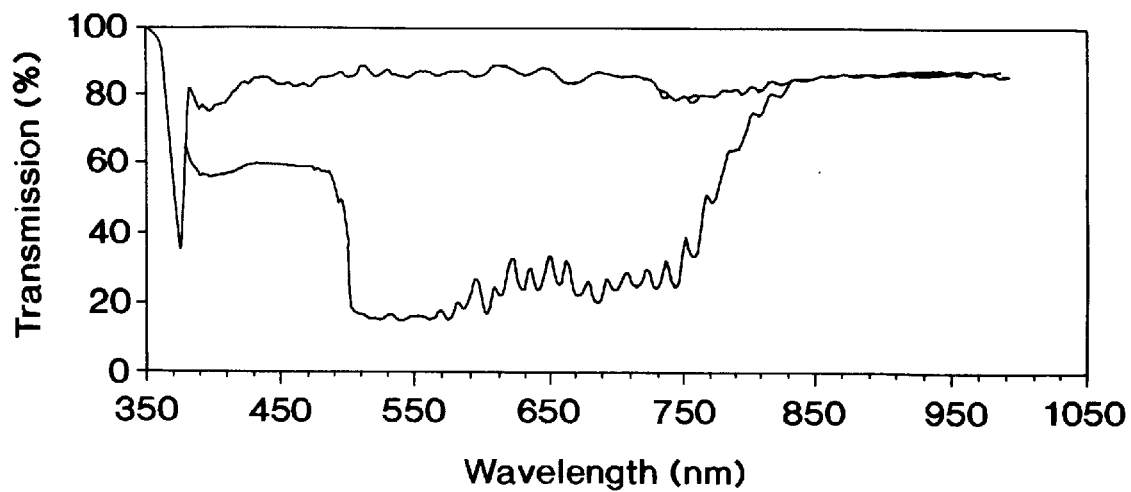
FIG. 2 shows the spectrum of a broad waveband reflective polarizer that can be used together with the inventive compensation films in a special embodiment of the invention.

The broad waveband reflective polarizer film consisted of a polymerized mixture of reactive cholesteric mesogenic compounds. This polarizer exhibited multiple pitch lengths of the cholesteric helix and had a broad reflection band as shown in FIG. 2 with a bandwidth of about 260 nm.

The adhesive layer was prepared by curing a coated mixture of hexanediol diacrylate with 1% Irgacure 651 under UV light with an irradiance of 70 mW/cm² for 3 minutes and had a thickness of 20 microns.

EXAMPLE 1B

Figure 3:
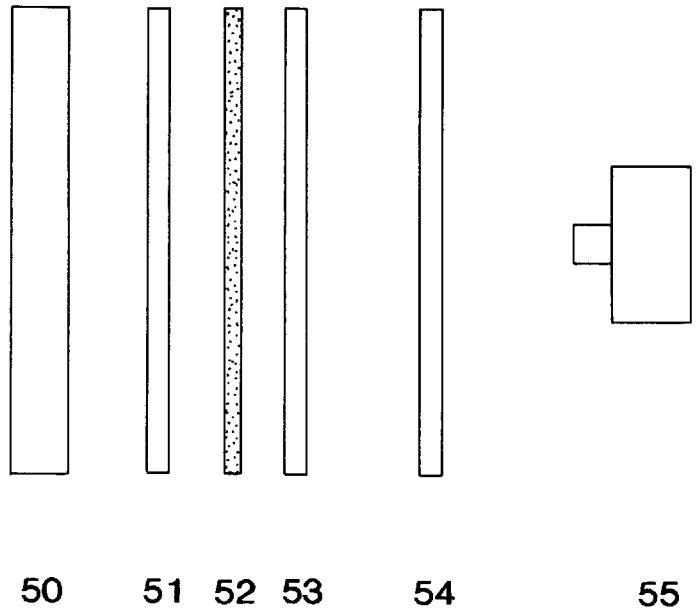
FIG. 3 shows the measurement setup according to example 1 of the present invention.
Figure 4:
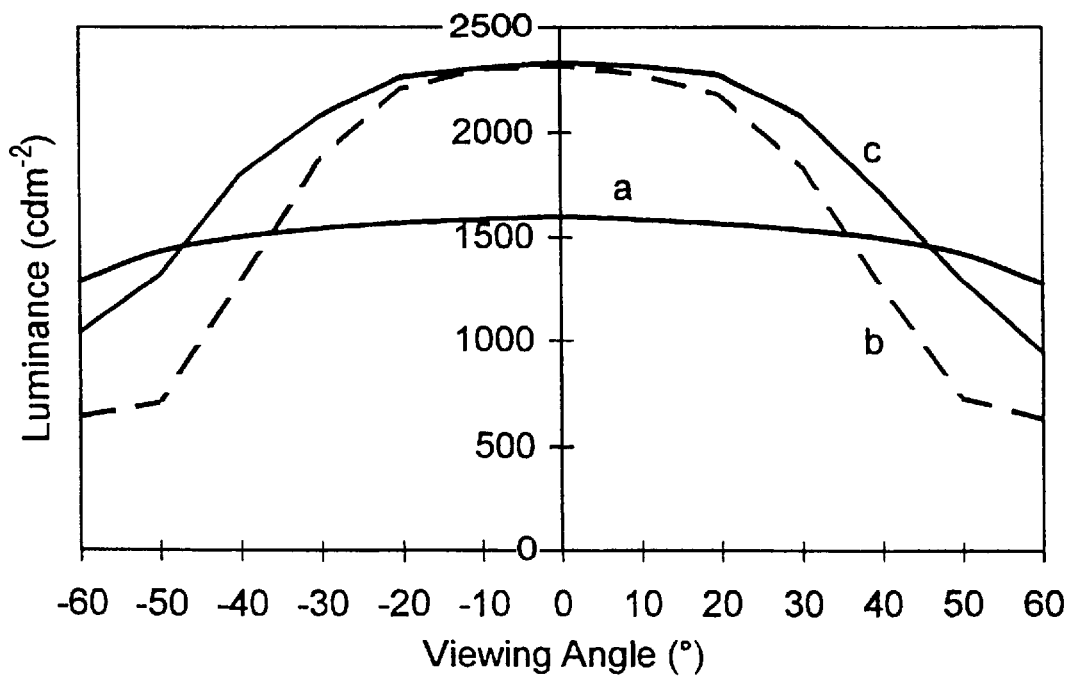
FIG. 4 shows the luminance versus viewing angle for a broad waveband reflective polarizer when used with or without a compensation film according to the present invention.

In the measurements described below the luminance of light from a commercial LCD backlight 50 passing through an embodiment as depicted in FIG. 3 with the reflective polarizer 51 and the inventive homeotropic compensation film 52 of 1A, a quarter wave foil (QWF) 53 and a linear polarizer 54 (polarization axis at 45° to the fast axis of the QWF) was measured using a Minolta CS—100 colour camera 55 at a range of viewing angles (−60° to +60°). The measurement results are shown in FIG. 4.

First the results for an uncompensated polarizer combination consisting of the reflective polarizer 51, QWF 53 and linear polarizer 54 (curve 4b), but not containing the inventive compensation film 52, were compared to the same experiment using the linear polarizer 54 alone (curve 4a).

From curve 4b it can be seen that a brightness enhancement, i.e. an increase of the luminance, of approximately 44% was measured at normal incidence (viewing angle=0°) compared to 4a. However, as the viewing angle increased the increasing phase retardation by the reflective polarizer itself caused a notable reduction to the measured luminance, coinciding with the value measured for the linear polarizer at a cross-over angle of 36°.

Then the results were compared to a compensated polarizer combination consisting of the reflective polarizer 51, the inventive homeotropic compensation film 52, the QWF 53 and the linear polarizer 54 (4c). The crossover angle increased from approximately 36° without the compensation film to approximately 47° with the compensation film. When comparing the curves 4b (uncompensated) and 4c (compensated) it can also be seen that the brightness was significantly enhanced for all viewing angles when using the homeotropic compensation film.

Figure 5:
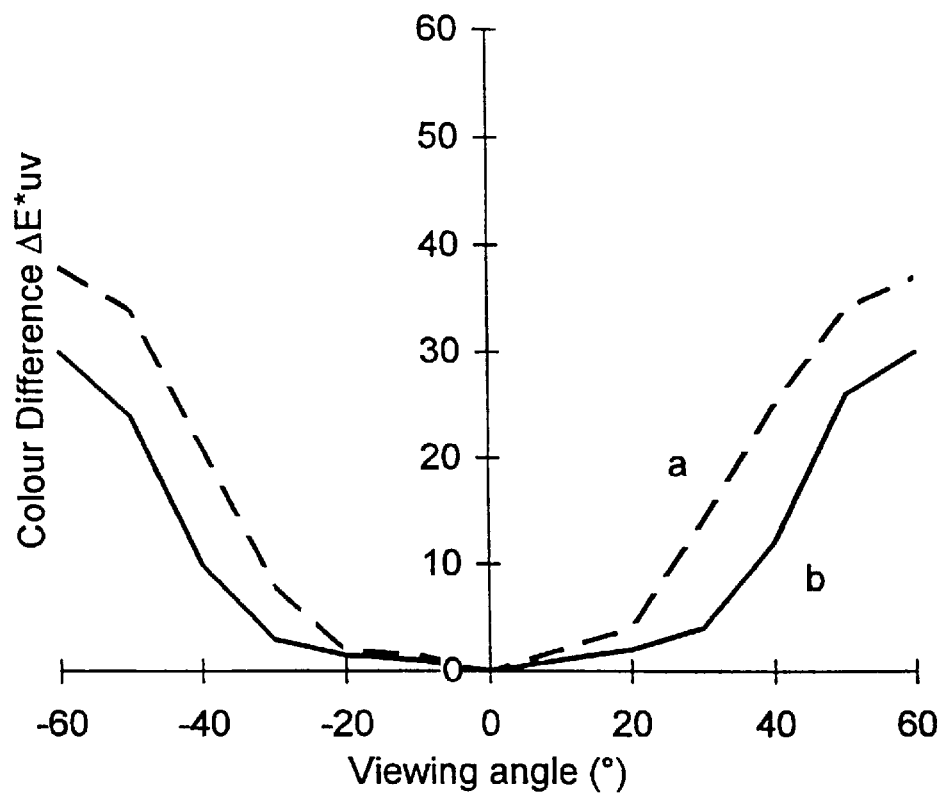
FIG. 5 shows the color difference versus viewing angle for a broad waveband reflective polarizer when used with or without a compensation film according to the present invention.

FIG. 5 shows the colour difference ($\Delta E^*_{uv}$ in the CIE 1976 L*u*v* colour space) for the compensated (5b) and non-compensated (5a) samples. The compensation foil causes a lower colour difference with increasing angle, as depicted by curve 5b, compared to the sample without compensation film (curve 5a). For example at a viewing angle of 40° the colour difference of the sample with the compensation film is approximately half of that of the sample without the compensation film.

EXAMPLE 2

The following mixture was formulated

| | |
|---|---|
| compound (5) | 69% |
| compound (6) | 19% |
| Irgacure 651 | 12% |

The direactive compound (5) can be prepared in an analogy to the synthesis of the compounds described in WO 93/22397. The compound (6) can be prepared in analogy to compounds (1) to (4).

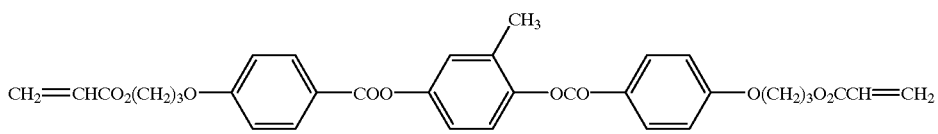

(5)

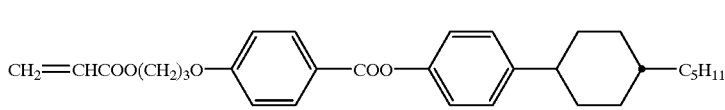

(6)

The mixture has the mesophase behaviour $S_A$ 76 N 117 I.

A 20% solution of the mixture in cyclopentanone was coated onto a silica coated PET substrate and the solvent was allowed to evaporate. The mixture was cured by exposure to UV light at 60° C. to give a homeotropically aligned film. When using this film as a compensator in an embodiment as described in Example 1B, a crossover angle of 60° was observed.

EXAMPLE 3

The following mixture was formulated

| | |
|---|---|
| compound (5) | 40% |
| compound (7) | 10% |
| compound (8) | 46% |
| Irgacure 907 | 4% |

Irgacure is a commercially available photoinitiator (Ciba Geigy AG). The compounds (7) and (8) can be prepared in analogy to compounds (1) to (4).

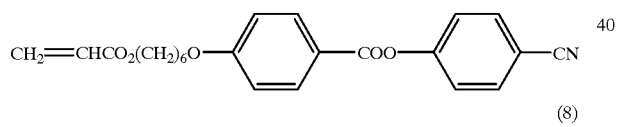

(7)

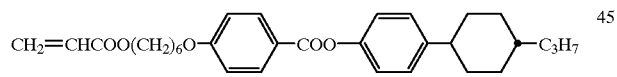

(8)

A polymer film with a homeotropic orientation that can be used as a compensator as described in the foregoing and the following was prepared by coating, aligning and curing the above mixture as described in example 1A.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A liquid crystal display device comprising:
  a liquid crystal cell and at least one compensation film or a combination of polarizers and optical compensators comprising at least one compensation film,
  said compensation film comprising at least one layer of an anisotropic polymer obtained by polymerization of polymerizable mesogenic material comprising
    a) two or more mesogenic compounds having at least one rod-like or board-like mesogenic group and and at least one polymerizable functional group, in the presence of
    b) an initiator,
    c) optionally a non-mesogenic compound having two or more polymerizable functional groups, and
    d) optionally a stabilizer,
  wherein said layer of an anistropic polymer has a homeotropic or tilted homeotropic molecular orientation,
  wherein said mesogenic compounds having at least one rod-like or board-like mesogen and at least one polymerizable functional group are compounds of formula I $$P—(Sp—X)_n—MG—R \qquad I$$

wherein
  P is a polymerizable group,
  Sp is a spacer group having 1 to 20 C atoms,
  X is a group selected from —O—, —S—, —CO—, —COO—, —OCO—, —OCOO— or a single bond,
  n is 1,
  MG is a group according to formula II $$—(A^1—Z^1)_m—A^2—Z^2—A^3— \qquad II$$

wherein
  $A^1$, $A^2$ and $A^3$ are independently from each other:
    1,4-phenylene or 1,4-phenylene in which one or more CH groups is replaced by N,
    1,4-cyclohexylene or 1,4-cyclohexylene in which one or two non-adjacent $CH_2$ groups is replaced in each case by O or S,
    1,4-cyclohexenylene, or
    naphthalene-2,6-diyl,
  wherein in each case the group is unsubstituted, or mono- or polysubstituted with halogen, cyano, nitro, alkyl having 1 to 7 C atoms, alkoxy having 1 to 7 C atoms, alkanoyl having 1 to 7 C atoms, alkyl having 1 to 7 C atoms wherein one or more H atoms is replaced by F or Cl, alkoxy having 1 to 7 C atoms wherein one or more H atoms is replaced by F or Cl, or alkanoyl having 1 to 7 C atoms wherein one or more H atoms is replaced by F or Cl,
  $Z^1$ and $Z^2$ are each independently —COO—, —OCO—, —$CH_2CH_2$—, —$OCH_2$—, —$CH_2O$—, —CH=CH—, —C≡C—, —CH=CH—COO—, —OCO—CH=CH— or a single bond,
  m is 0, 1 or 2, and R is alkyl having up to 25 C atoms, alkyl having up to 25 C atoms which is mono- or polysubstituted by halogen or CN, wherein, in each case, one or more non-adjacent CH$_2$ groups is optionally replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P—(Sp—X)$_n$—, wherein said polymerizable mesogenic material contains at least 75% by weight of compounds of formula I.

2. A liquid crystal display device as claimed in claim 1, wherein said device it comprises a broad band reflective polarizer.

3. A liquid crystal display device as claimed in claim 2, wherein the phase retardation of the compensation film is opposite in sign to the phase retardation of the broad band reflective polarizer over the range of viewing angles from 0±90 degrees.

4. A liquid crystal display device as claimed in claim 1, wherein the compensation film is a composite film comprising two or more layers of an anisotropic polymer at least one of said layers having a homeotropic or tilted homeotropic orientation.

5. A liquid crystal display device as claimed in claim 4, wherein at least one layer of said composite compensation film has an optical symmetry axis with a different orientation than the optical symmetry axis of at least one other of said layers.

6. A compensation film comprising at least one layer of an anisotropic polymer with homeotropic or tilted homeotropic molecular orientation, wherein said compensation film is obtained by
A) coating a mixture of a polymerizable mesogenic material comprising
   a) two or more mesogenic compounds having at least one rod-like or board-like mesogenic group and at least one polymerizable functional group,
   b) an initiator,
   c) optionally a non-mesogenic compound having two or more polymerizable functional groups, and
   d) optionally a stabilizer
   on at least one substrate in the form of a layer,
B) aligning said mixture in a homeotropic or tilted homeotropic orientation,
C) polymerizing said mixture by exposing it to heat or actinic radiation,
D) optionally repeating the steps A), B) and C) at least one more time, and
E) optionally removing said at least one substrate from the polymerized material, wherein said mesogenic compounds having at least one rod-like or board-like mesogen and at least one polymerizable functional group are compounds of formula I

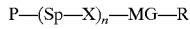  I wherein
P is a polymerizable group,
Sp is a spacer group having 1 to 20 C atoms,
X is a group selected from —O—, —S—, —CO—, —COO—, —OCO—, —OCOO— or a single bond,
n is 1, MG is a group according to formula II

  II wherein
A, A$^2$ and A$^3$ are independently from each other:
1,4-phenylene or 1,4-phenylene in which one or more CH groups is replaced by N,
1,4-cyclohexylene or 1,4-cyclohexylene in which one or two non-adjacent CH$_2$ groups is replaced in each case by O or S,
1,4-cyclohexenylene, or
naphthalene-2,6-diyl, wherein in each case the group is unsubstituted, or mono- or polysubstituted with halogen, cyano, nitro, alkyl having 1 to 7 C atoms, alkoxy having 1 to 7 C atoms, alkanoyl having 1 to 7 C atoms, alkyl having 1 to 7 C atoms wherein one or more H atoms is replaced by F or Cl, alkoxy having 1 to 7 C atoms wherein one or more H atoms is replaced by F or Cl, or alkanoyl having 1 to 7 C atoms wherein one or more H atoms is replaced by F or Cl, $Z_1$ and $Z^2$ are each independently —COO—, —OCO—, —CH$_2$CH$_2$—, —OCH$_2$—, —CH$_2$O—, —CH=CH, —C≡C, —CH=CH—COO—, —OCO—CH=CH— or a single bond, m is 0, 1 or 2, and R is alkyl having up to 25 C atoms, alkyl having up to 25 C atoms which is mono- or polysubstituted by halogen or CN, wherein, in each case, one or more non-adjacent CH$_2$ groups is optionally replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P—(Sp—X)$_n$—, wherein said polymerizable mesogenic material contains at least 75% by weight of compounds of formula I.

7. A compensation film as claimed in claim 6, wherein at least one substrate is a plastic film.

8. A compensation film as claimed in claim 6, wherein the mixture of the polymerizable mesogenic material comprises at least one mesogen having one polymerizable functional group and at least one mesogen having two or more polymerizable functional groups.

9. A compensation film as claimed in claim 6, wherein the mixture of the polymerizable mesogenic material comprises at least two mesogens having one polymerizable functional group.

10. A compensation film as claimed in claim 6, wherein the polymerized material forms a three-dimensional network.

11. A compensation film according to claim 6, wherein the mixture of the polymerizable mesogenic material consists essentially of:
a1) 15 to 85% by weight of at least one mesogen according to formula I having one polymerizable functional group,
a2) 10 to 80% by weight of at least one mesogen according to formula I having two or more polymerizable functional groups,
b) 0.01 to 5% by weight of an initiator, c) 0 to 20% by weight of a non-mesogenic compound having two or more polymerizable functional groups, and d) 0 to 1000 ppm of a stabilizer, wherein said polymerizable mesogenic material contains at least 75% by weight of compounds of formula I.

12. A compensation film according to claim 6, wherein, the mixture of the polymerizable mesogenic material essentially consists of a) 75 to 99% by weight of at least two mesogens according to formula I having one polymerizable functional group, b) 0.01 to 5% by weight of an initiator, c) 0 to 20% by weight of a non-mesogenic compound having two or more polymerizable functional groups, and d) 0 to 1000 ppm of a stabilizer.

13. A mixture of a polymerizable mesogenic material comprising a) 75 to 99% by weight of two or more achiral mesogenic compounds having at least one rod-like or board-like mesogen and one polymerizable functional group in the presence of b) 0.01 to 5% by weight of an initiator, c) 0 to 20% by weight of a non-mesogenic compound having two or more polymerizable functional groups, and d) 0 to 1000 ppm of a stabilizer, wherein said two or more achiral mesogenic compound having at least one rod-like or board-like mesogen and one polymerizable functional group are compounds of formula I

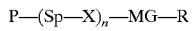   P—(Sp—X)$_n$—MG—R   I wherein

P is a polymerizable group,

Sp is a spacer group having 1 to 20 C atoms,

X is a group selected from —O—, —S—, —CO—, —COO—, —OCO—, —OCOO— or a single bond, n is 0 or 1, MG is a group according to formula II

   —(A$^1$—Z$^1$)$_m$—A$^2$—Z$^2$—A$^3$—   II wherein

A$^1$, A$^2$ and A$^3$ are independently from each other:

1,4-phenylene or 1,4-phenylene in which one or more CH groups is replaced by N, 1,4-cyclohexylene or 1,4-cyclohexylene in which one or two non-adjacent CH$_2$ groups are replaced in each case by O or S, 1,4-cyclohexenylene, or naphthalene-2,6-diyl, wherein in each case the group is unsubstituted, or mono- or polysubstituted with halogen, cyano, nitro, alkyl having 1 to 7 C atoms, alkoxy having 1 to 7 C atoms, alkanoyl having 1 to 7 C atoms, alkyl having 1 to 7 C atoms wherein one or more H atoms is replaced by F or Cl, alkoxy having 1 to 7 C atoms wherein one or more H atoms is replaced by F or Cl, or alkanoyl having 1 to 7 C atoms wherein one or more H atoms is replaced by F or Cl, Z$^1$ and Z$^2$ are each independently —COO—, —OCO—, —CH$_2$CH$_2$—, —OCH$_2$—, —CH$_2$O—, —CH=CH, —C≡C, —CH=CH—COO—, —OCO—CH=CH— or a single bond, m is 0, 1 or 2, and R is alkyl having up to 25 C atoms, alkyl having up to 25 C atoms which is mono- or polysubstituted by halogen or CN, wherein, in each case, one or more non-adjacent CH$_2$ groups is optionally replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is halogen or cyano.

14. In a method of compensating the viewing angle dependence of the phase retardation of light transmitted by a broad band reflective polarizer by providing a compensation film to achieve said compensating, the improvement wherein said compensation film is a film according to claim 6.

15. A liquid crystal display device according to claim 2, wherein the bandwidth of said broad band reflective polarizer is at least 100 nm.

16. A liquid crystal display device according to claim 2, wherein the bandwidth of said broad band reflective polarizer is at least 150 nm.

17. A liquid crystal display device according to claim 4, wherein at least one of said layers of anisotropic polymer has an optical symmetry axis with a tilt angle, relative to the plane of the layer, of less than 90 degrees but greater than 45 degrees.

18. A liquid crystal display device according to claim 4, wherein at least one of said layers of anisotropic polymer has an optical symmetry axis with a tilt angle, relative to the plane of the layer, of less than 90 degrees but greater than 60 degrees.

19. A liquid crystal display device according to claim 4, wherein at least one of said layers of anisotropic polymer has an optical symmetry axis with a tilt angle, relative to the plane of the layer, of less than 90 degrees but greater than 75 degrees.

20. A liquid crystal display device according to claim 1, wherein said layer of anisotropic polymer has an optical symmetry axis which is oriented perpendicular to the layer.

21. A liquid crystal display device according to claim 1, wherein said layer of anisotropic polymer has an optical symmetry axis with a tilt angle, relative to the plane of said layer, of less than 90 degrees but higher than 45 degrees.

22. A liquid crystal display device according to claim 15, wherein the phase retardation of the compensation film is opposite in sign to the phase retardation of the broad band reflective polarizer over viewing angles, measured from the normal plane of the film, of 0 to +/−85 degrees.

23. A liquid crystal display device according to claim 1, wherein said polymerizable mesogenic material contains up to 20% of non-mesogenic compounds with two or more polymerizable functional groups selected from alkyldiacrylates or alkyldimethacrylates having alkyl groups with 1–20 C atoms.

24. A liquid crystal display device according to claim 1, wherein said polymerizable mesogenic material exhibits a nematic or smectic phase.

25. A compensation film according to claim 6, wherein said polymerizable mesogenic material exhibits a nematic or smectic phase.

26. A compensation film according to claim 6, wherein polymerization is carried out in the smectic phase of said polymerizable mesogenic mixture.

27. A compensation film according to claim 26, wherein polymerization is carried out in the smectic A phase of said polymerizable mesogenic mixture.

28. A compensation film according to claim 6, wherein said polymerizable mesogenic material contains 40–99% of at least one mesogenic according to formula I having one polymerizable functional group.

29. A device according to claim 1, wherein said polymerizable mesogenic material further comprises one or more surface-active compounds.

30. A compensation film according to claim 6, wherein said polymerizable mixture further comprises one or more surface-active compounds.

31. A mixture according to claim 13, wherein said polymerizable mixture further comprises one or more surface-active compounds.

32. A mixture of a polymerizable mesogenic material comprising
   a) at least two mesogenic compounds each having at least one rod-like or board-like mesogen, wherein one of said mesogenic compounds has one polymerizable functional group and another of said mesogenic compounds has two or more polymerizable functional groups,
   b) 0.01 to 5% by weight of an initiator,
   c) 0 to 20% by weight of a non-mesogenic compound having two or more polymerizable functional groups, and
   d) 0 to 1000 ppm of a stabilizer,
wherein said at least two mesogenic compound are compounds of formula I

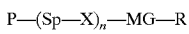    I wherein
P is a polymerizable group,
Sp is a spacer group having 1 to 20 C atoms,
X is a group selected from —O—, —S—, —CO—, —COO—, —OCO—, —OCOO— or a single bond,
n is 0 or 1,
MG is a group according to formula II

    II wherein
$A^1$, $A^2$ and $A^3$ are independently from each other:
   1,4-phenylene or 1,4-phenylene in which one or more CH groups is replaced by N,
   1,4-cyclohexylene or 1,4-cyclohexylene in which one or two non-adjacent CH$_2$ groups is replaced in each case by O or S,
   1,4-cyclohexenylene, or
   naphthalene-2,6-diyl,
wherein in each case the group is unsubstituted, or mono- or polysubstituted with halogen, cyano, nitro, alkyl having 1 to 7 C atoms, alkoxy having 1 to 7 C atoms, alkanoyl having 1 to 7 C atoms, alkyl having 1 to 7 C atoms wherein one or more H atoms is replaced by F or Cl, alkoxy having 1 to 7 C atoms wherein one or more H atoms is replaced by F or Cl, or alkanoyl having 1 to 7 C atoms wherein one or more H atoms is replaced by F or Cl,
$Z^1$ and $Z^2$ are each independently —COO—, —OCO—, —CH$_2$CH$_2$—, —OCH$_2$—, —CH$_2$O—, —CH=CH, —C≡C, —CH=CH—COO—, —OCO—CH=CH— or a single bond,
m is 0, 1 or 2, and
R is straight chain or achiral branched alkyl having up to 25 C atoms, wherein, in each case, one or more non-adjacent CH$_2$ groups is optionally replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another,
wherein component a) consists essentially of
   a1) 15 to 85% by weight of said mesogenic compound having one polymerizable functional group, and
   a2) 10 to 80% by weight of said mesogenic compound having two or more polymerizable functional groups, and
wherein said polymerizable mesogenic material contains at least 75% by weight of compounds of formula I.

33. A device according to claim 1, wherein P is CH$_2$=CW—COO—, WCH=CH—O—,

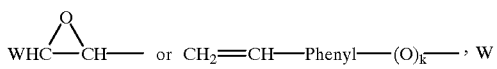

is H, CH$_3$ or Cl, k is 0 or 1, and Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C—.

34. A compensation film according to claim 6, wherein P is CH$_2$=CW—COO—,

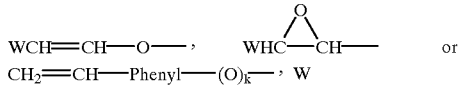

is H, CH$_3$ or Cl, k is 0 or 1, and Sp is a linear or branched alkylene group having 1–20 C. atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C—.

35. A mixture of polymerizable material according to claim 13, wherein P is

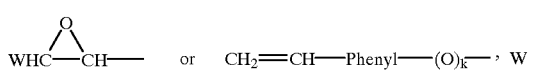

is H, CH$_3$ or Cl, k is 0 or 1, and Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C—.

* * * * *